US010353964B2

(12) United States Patent
Venugopal et al.

(10) Patent No.: US 10,353,964 B2
(45) Date of Patent: Jul. 16, 2019

(54) EVALUATING SEMANTIC INTERPRETATIONS OF A SEARCH QUERY

(71) Applicant: Google LLC, Mountain View, CA (US)

(72) Inventors: Ashish Venugopal, Jersey City, NJ (US); Jakob D. Uszkoreit, San Francisco, CA (US); John Blitzer, Mountain View, CA (US); Edward Everett Anderson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 716 days.

(21) Appl. No.: 14/644,803

(22) Filed: Mar. 11, 2015

(65) Prior Publication Data
US 2016/0078131 A1    Mar. 17, 2016

Related U.S. Application Data

(60) Provisional application No. 62/050,627, filed on Sep. 15, 2014.

(51) Int. Cl.
*G06F 16/951* (2019.01)
*G06F 16/33* (2019.01)

(52) U.S. Cl.
CPC .......... *G06F 16/951* (2019.01); *G06F 16/334* (2019.01)

(58) Field of Classification Search
CPC ......... G06F 17/30879; G06F 17/30675; G06F 17/30864
See application file for complete search history.

(56) References Cited

U.S. PATENT DOCUMENTS

| 7,747,614 | B2 * | 6/2010 | Freeman | G06F 17/30864 |
| | | | | 707/707 |
| 7,917,490 | B2 * | 3/2011 | Norris | G06F 16/9537 |
| | | | | 707/707 |
| 8,285,745 | B2 * | 10/2012 | Li | G06F 17/30672 |
| | | | | 707/706 |
| 8,346,791 | B1 | 1/2013 | Shukla et al. | |

(Continued)

OTHER PUBLICATIONS

International Search Report and Written Opinion in International Application No. PCT/US2015/047918, dated Dec. 2, 2015, 11 pages.

(Continued)

*Primary Examiner* — Brittany N Allen
*Assistant Examiner* — David M Nafziger
(74) *Attorney, Agent, or Firm* — Fish & Richardson P.C.

(57) ABSTRACT

The present disclosure relates to evaluating different semantic interpretations of a search query. One example method includes obtaining a set of search results for a particular search query submitted to a search engine; obtaining a set of semantic interpretations for the particular search query; obtaining, for each semantic interpretation of the set, a canonical search query; generating a modified search query based at least in part on the particular search query and the canonical search query for the semantic interpretation; obtaining a set of search results for the modified search query for the semantic interpretation; and determining, for each semantic interpretation of the set, a degree of similarity between (i) the set of search results of the modified search query for the semantic interpretation, and (ii) the set of search results for the particular search query.

14 Claims, 5 Drawing Sheets

(56) References Cited

U.S. PATENT DOCUMENTS

| | | | |
|---|---|---|---|
| 9,152,676 B2* | 10/2015 | Madhavan | G06F 16/248 |
| 9,443,015 B1* | 9/2016 | Eischeid | G06Q 30/02 |
| 2007/0078822 A1 | 4/2007 | Cucerzan et al. | |
| 2007/0129997 A1* | 6/2007 | Davies | G06Q 30/02 |
| | | | 705/14.52 |
| 2007/0203942 A1* | 8/2007 | Hua | G11B 27/105 |
| 2009/0063461 A1* | 3/2009 | Wang | G06Q 30/02 |
| 2009/0157611 A1 | 6/2009 | Kipersztok | |
| 2009/0292685 A1* | 11/2009 | Liu | G06F 16/73 |
| 2010/0036829 A1* | 2/2010 | Leyba | G06F 17/30684 |
| | | | 707/739 |
| 2010/0082662 A1* | 4/2010 | Taylor | G06F 16/2428 |
| | | | 707/769 |
| 2010/0228693 A1* | 9/2010 | Dawson | G06F 17/2705 |
| | | | 706/12 |
| 2010/0228710 A1* | 9/2010 | Imig | G06F 16/9535 |
| | | | 707/706 |
| 2011/0016111 A1* | 1/2011 | Xie | G06F 16/3346 |
| | | | 707/723 |
| 2011/0179021 A1* | 7/2011 | Wen | G06F 17/30265 |
| | | | 707/723 |
| 2011/0314010 A1* | 12/2011 | Ganti | G06F 16/2425 |
| | | | 707/728 |
| 2011/0320440 A1* | 12/2011 | McDonald | G06F 16/958 |
| | | | 707/723 |
| 2013/0031074 A1* | 1/2013 | Vartanian | G06F 16/9535 |
| | | | 707/706 |
| 2013/0268517 A1* | 10/2013 | Madhavan | G06F 16/248 |
| | | | 707/722 |
| 2014/0059078 A1* | 2/2014 | Gulwani | G06F 16/3338 |
| | | | 707/772 |
| 2014/0188935 A1* | 7/2014 | Vee | G06Q 30/0241 |
| | | | 707/771 |
| 2014/0310607 A1* | 10/2014 | Abraham | G06Q 10/1053 |
| | | | 715/738 |
| 2015/0039581 A1* | 2/2015 | John | G06F 16/38 |
| | | | 707/706 |
| 2015/0161260 A1* | 6/2015 | Balani | G06F 16/24578 |
| | | | 707/723 |
| 2015/0248454 A1* | 9/2015 | Muraoka | G06F 16/2425 |
| | | | 707/727 |
| 2015/0269175 A1* | 9/2015 | Espenshade | G06F 16/90324 |
| | | | 706/47 |
| 2016/0041986 A1* | 2/2016 | Nguyen | G06Q 50/01 |
| | | | 707/711 |
| 2016/0048545 A1* | 2/2016 | Zhang | G06F 16/23 |
| | | | 707/749 |
| 2016/0063093 A1* | 3/2016 | Boucher | G06F 16/90324 |
| | | | 707/748 |
| 2016/0063096 A1* | 3/2016 | Bostick | G06F 16/3346 |
| | | | 707/728 |

OTHER PUBLICATIONS

Anyanwu, Kemafor et al., "SemRank: Ranking Complex Relationship Search Results on the Semantic Web", Proceedings of the 14th International Conference on World Wide Web, 2005, 11 pages.

Finkelstein, Lev et al., "Placing Search in Context: The Concept Revisited", Proceedings of the 10th International Conference on World Wide Web, 2001 16 pages.

Guha, R. et al., "Semantic Search", Proceedings of the 12th International Conference on World Wide Web, 2003, 10 pages.

Haase, Peter et al., "Semantic Wiki Search", Proceedings of the 6th European Semantic Web Conference, 2009, 16 pages.

Patel, Chintan et al., "OntoKhoj: A Semantic Web Portal for Ontology Searching, Ranking and Classification", Proceedings of the 4th ACM International Workshop on Web Information and Data Management, 2003, 4 pages.

* cited by examiner

EVALUATING SEMANTIC INTERPRETATIONS OF A SEARCH QUERY

CROSS-REFERENCE TO RELATED APPLICATION

This application claims the benefit of U.S. Provisional Application Ser. No. 62/050,627, filed on Sep. 15, 2014, which is incorporated by reference.

TECHNICAL FIELD

This document generally relates to search engines, and specifically to evaluating different semantic interpretations of a search query.

BACKGROUND

The Internet is a global network of computers that provide information in response to requests. This information is in the form of electronic resources, such as, for example, web pages, electronic files, or other resources. Search engines organize these resources according to the information they contain, allow users to submit search queries to find resources containing information pertaining to the particular query. In some instances, a search query may be a collection of words submitted to the search engine that define the information sought by the user. A search query may also include Boolean operators (e.g., OR and AND), search directives (e.g., restricting a search to a specific domain), or other components.

SUMMARY

The present disclosure relates to evaluating different semantic interpretations of a search query. One example technique includes determining one or more semantic interpretations of the particular search query. Each semantic interpretation is associated with at least one canonical query. For each semantic interpretation, a modified search query is generated based on the original search query and the associated canonical query. Search results are then obtained for the particular search query and the modified search queries. The search results of each modified search query and the search results of the original search query are compared to evaluate the semantic interpretation associated with each modified search query. For example, each semantic interpretation can be ranked or validated. In this manner, different semantic interpretations for the original search query can be compared to each other. In some cases, a semantic interpretation for the original search query can be selected based on the comparison.

One example method includes obtaining a set of search results for a particular search query submitted to a search engine; obtaining a set of semantic interpretations for the particular search query, each semantic interpretation representing a candidate intent associated with the particular search query; obtaining, for each semantic interpretation of the set, a canonical search query; generating, for each semantic interpretation of the set, a modified search query based at least in part on the particular search query and the canonical search query for the semantic interpretation; obtaining, for each semantic interpretation of the set, a set of search results for the modified search query for the semantic interpretation; and determining, for each semantic interpretation of the set, a degree of similarity between (i) the set of search results of the modified search query for the semantic interpretation, and (ii) the set of search results for the particular search query.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search engine may provide search results based on a search query provided by a user by consulting an index to identify resources containing information related to the query, and by applying algorithms to order the identified resources based on relevance to the query. In order to improve search result quality, the search engine may interpret received search queries to discern a likely intent associated with each query, e.g., what information the query is likely seeking. For example, a search query that recites "What is Barack Obama's middle name?" may be associated with an intent to find Barack Obama's middle name. However, some search queries may be vague or ambiguous and may not be easily associated with a particular intent. For example, a query that recites "Washington's age" could refer, for example, to President George Washington, actor Denzel Washington, the state of Washington, or Washington D.C. Determining the user intent associated with such ambiguous queries may be challenging.

Accordingly, the present disclosure describes techniques for evaluating different interpretations of a particular search query. One example technique includes determining one or more semantic interpretations of the particular search query. Each semantic interpretation is associated with at least one canonical query. For each semantic interpretation, a modified search query is generated based on the original search query and the associated canonical query. Search results are then obtained for the particular search query and the modified search queries. The search results of each modified search query and the search results of the original search query are compared to evaluate the semantic interpretation associated with each modified search query. For example, each semantic interpretation can be ranked or validated. In this manner, different semantic interpretations for the original search query can be compared to each other. In some cases, a semantic interpretation for the original search query can be selected based on the comparison.

Techniques according to the present disclosure may offer at least the following advantages. Using search results to evaluate the different semantic interpretations, other data sources such as click-through data, user-specific data, and others that are utilized when producing the search results are taken into account without the need to perform additional analysis. In addition, by evaluating different semantic interpretations for a query, a user intent may be predicted for the query, thereby lessening the effect of any ambiguity in the query on the quality of the identified search results.

Figure 1:
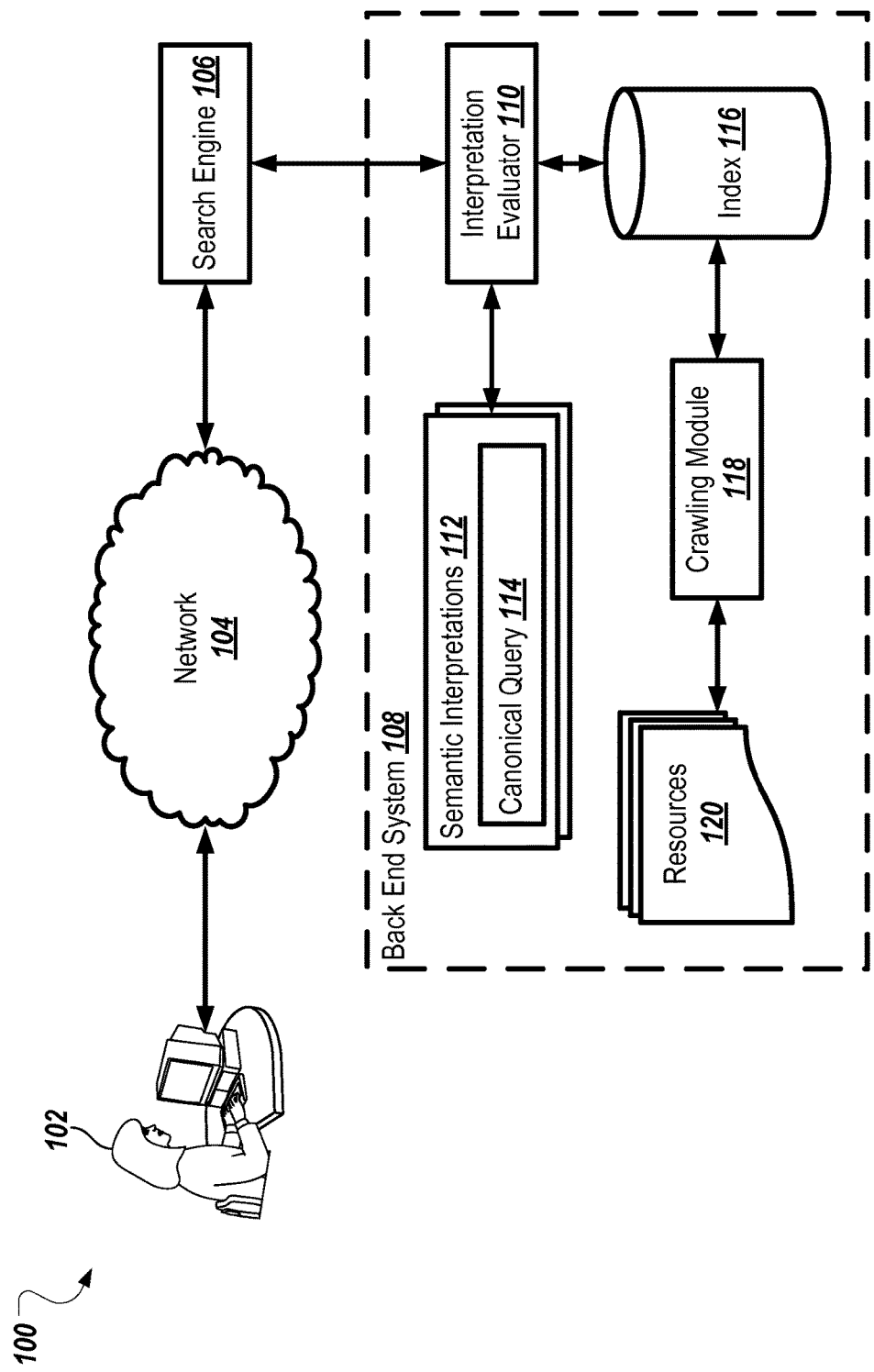
FIG. 1 depicts an example system for evaluating semantic interpretations of a search query.

FIG. 1 depicts an example system 100 for evaluating semantic interpretations of a search query. The system 100 includes a search engine 106 that obtains search results based on a query. In some implementations, system 100 may also include a back-end system 108 that can crawl, index, and/or annotate network resources 120. The back-end system 108 may include a crawling module 118 and an index 116. The back-end system 108 may also include an interpretation evaluator 110 that can receive semantic interpretations 112 and their associated canonical queries 114.

In operation, the search engine 106 may receive an original search query from the user 102 over the network 104. The search engine 106 may provide the original search query to the back end system 108 to obtain a set of search results for the original search query. The interpretation evaluator 110 may receive the original search query and determine a set of semantic interpretations 112 associated with the search query. Each semantic interpretation 112 is associated with a canonical query 114 representing a query to be used for obtain information associated with the semantic interpretation. The interpretation evaluator 110 may then produce modified queries for each semantic interpretation 112, each modified query based on the search query and the canonical query 114 for the particular semantic interpretation. The interpretation evaluator 110 may then obtain search results for the search query and each modified query, and may evaluate each of the semantic interpretations 112 based on the similarity of the search results associated with the corresponding modified query to the search results associated with the original search query. In some cases, each semantic interpretation 112 may be associated with multiple canonical queries, each representing a different query that may be used for obtain information associated with the semantic interpretation. In such a case, each canonical query may be evaluated separately, such as, for example, by producing a separate modified query for each canonical query, as described below.

As shown, the user 102 communicates with the search engine 106 over the network 104. In some cases, the user 102 may be a person interacting with a computing device to submit the search query, such as, for example, by typing the search query into a web browser. The user 102 may also be a software or hardware process accessing the search engine 106 through an Application Programming Interface (API). The user 102 may communicate with the search engine 106 over a network 104, which may include, for example, the Internet, a local area network (LAN), a wide area network (WAN), a virtual private network (VPN), a WIFI network, a cellular telephone network, or other networks or combinations of networks.

The search engine 106 may be a server or set of servers operable to receive search queries over the network 104. In some cases, the search engine 106 may be a web server communicating with the user 102 using one or more network protocols, including, but not limited to, Hypertext Transfer Protocol (HTTP), File Transfer Protocol (FTP), Remote Procedure Call (RPC), or other protocols. The search engine 106 may also include components for distributing requests to different servers, such as a load balancer (not shown).

In some cases, the search engine 106 may receive search queries from the user 102 and determine how to process the query. In some instances, the search engine 106 may preprocess the query, which may include removing whitespace, correcting spelling errors, converting between languages, transcribing a voice query to text, and/or structuring the query into a particular format. The search engine 106 submits the search query to the back end system 108 to obtain search results associated with the search query.

The system 100 also includes the back end system 108. The back end system 108 may crawl, index, and/or annotate resources 120 (e.g., web pages) across one or more systems or networks. The back end system 108 may include a crawling module 118 that crawls the Internet, for example, and indexes resources 120 encountered in the crawl. In some implementations, the crawling module 118 accesses a first resource that links to one or more other resources. The crawling module 118 may load the first resource and store its text in index 116, which is a database that includes information about the crawled resources 120 and their content, such as text, that is associated with the resources 120. Once the crawling module 118 stores information about the first resource in index 116, it can then load the other resources 120 that are linked from the first resource and repeat the indexing process. By repeatedly accessing and indexing resources 120 linked from other resources 120, the crawling module 118 can capture and index a substantial portion of the resources 120 that are accessible to the crawling module 118. The crawling module 118 can crawl and index the resources 120 even before a query is received by the system 100 or before search engine 106 submits the query to obtain search results. The search engine 106 can then obtain search results by searching index 116 rather than directly searching the resources 120.

Queries submitted to the back end system 108 by the search engine 106 may be received and processed by the interpretations evaluator 110. The interpretation evaluator 110 may evaluate a received search query to determine one or more semantic interpretations 112 associated with the search query. Each semantic interpretation 112 may represent a possible intent associated with the search query. Because the search query may be ambiguous, multiple semantic interpretations 112 may be identified. For example, in the search query "how long is harry potter" the terms "harry potter" are ambiguous, as they may refer to one or more particular topics such as any of the seven books in the Harry Potter franchise, any of the film adaptations of the books, or a ride, theme park, audiobook, cartoon, etc. associated with the Harry Potter franchise. The query could also refer to the Harry Potter character itself. Depending on which topic the user intended to refer to in the query, a different interpretation can apply, or even several different interpretations. Thus, if the query is referring to a book, the user probably wants to know the number of words or pages in the book. If, on the other hand, the query is referring to one of the movies, the film's running time is probably of interest. Or if "harry potter" refers to the fictional character, then length may refer to his height. Each of these are possible semantic interpretations of the query. In this manner, the interpretation evaluator 110 may determine semantic interpretations 112 for the particular query.

In some implementations, a confidence score may be determined for each of the semantic interpretations 112 representing a likelihood that the associated interpretation matches the user intent for the particular query. A confidence threshold may also be defined to indicate a minimum confidence score necessary for a semantic interpretation 112 to be considered when returning search results to the user 102. For example, the confidence threshold may specify that semantic interpretations 112 with confidence scores over 90 for a particular search query should be considered when returning search results. The interpretation evaluator 110 may also use the confidence score to determine which of the semantic interpretations 112 to assign to a particular query, such as, for example, by assigning the semantic interpretation with the highest confidence score. In some cases, the confidence score may a numeric value in a range of values, a discrete value from a set of values, or another type of indicator.

Each semantic interpretation 112 is associated with a canonical query 114. The canonical query 114 may be a query that conveys the user intent associated with a particular semantic interpretation. In some cases, the canonical query 114 may be a structure or template used to generate a modified search query from the original particular query. The canonical query 114 may be combined with information in the particular query to generate the modified search query. In some implementations, the canonical query 114 is a string with incomplete portions that can be completed using substrings the particular query. For example, the canonical query 114 may be an incomplete query such as "how many pages is the book <NAME OF BOOK ENTITY>." A modified search query may be generated from the canonical query 114 using the portions of the particular query. For example, given the previous canonical query and the particular query "how long is harry potter," the modified search query "how many pages is the book harry potter" may be generated. In some cases, generating the modified search query for each semantic interpretation includes reformatting the particular search query to match the canonical search query for the semantic interpretation. For example, a given query "how long is the book harry potter" could be reformatted to "how long is the harry potter book" to match a canonical query "how long is the book <NAME OF BOOK ENTITY>."

In some implementations, generating a modified search query for a semantic interpretation includes replacing a substring included in the particular search query identifying a particular entity with an alternate substring identifying the particular entity included in the canonical search query for the semantic interpretation. For example, the particular query "how long is harry potter" may have a semantic interpretation of asking for the number of pages in a book. A canonical query associated with this semantic interpretation could be "how long is the <NAME OF BOOK ENTITY> book." Thus, with "harry potter" identified as a particular entity, a modified search query could be generated by replacing the substring "harry potter" in the particular search query with the substring "harry potter book" derived from the canonical search query. An example modified search query could be, for example, "how long is the harry potter book." In some implementations, a single semantic interpretation 112 may have multiple associated canonical queries 114.

In some implementations, the interpretation evaluator 110 obtains search results from the index 116 for the one or more modified search queries associated with the semantic interpretations 112. The modified search query results may be used to evaluate the semantic interpretation 112 associated with the respective modified search query. For example, each semantic interpretation 112 may be evaluated based on a degree of similarity between the search results for the particular search query and the search results of the associated modified search query for the semantic interpretation 112. In some implementations, the degree of similarity is based on the size of an intersection or the size of a difference between the modified search query results and the results for the particular search query. A larger intersection may indicate, for example, a greater probability that a semantic interpretation accurately describes the user's intent. Conversely, a larger difference may indicate, for example, that a semantic interpretation 112 is less likely to be an accurate representation of the user's intent. In some implementations, the degree of similarity is based on the frequency of occurrence of particular keywords associated with the particular search query in the modified search query results and the frequency within the search results for the particular search query. A greater frequency of keyword occurrence may indicate, for example, that the modified search query is more likely to return relevant results. In some implementations, the degree of similarity is based on comparing an order of the modified search query results with an order of the search results for the particular search query. In some cases, other data such as user click rate, site traffic data, or other data may be used to evaluate a semantic interpretation 112. These techniques or other techniques can be used to evaluate semantic interpretations 112, canonical queries 114, or modified search queries. In some cases, a particular semantic interpretation 112, canonical query 114, or modified search query is selected based on the degrees of similarity. In this manner, semantic interpretations 112, canonical queries 114, and modified search queries can be ranked, validated, analyzed, and otherwise evaluated. In some implementations, the evaluation of a semantic interpretation 112 can be used to generate the results to the particular search query that are returned to the user. For example, results from modified search queries can be used to order the particular search query results. Other implementations are also possible within the scope of this disclosure.

Figure 2:
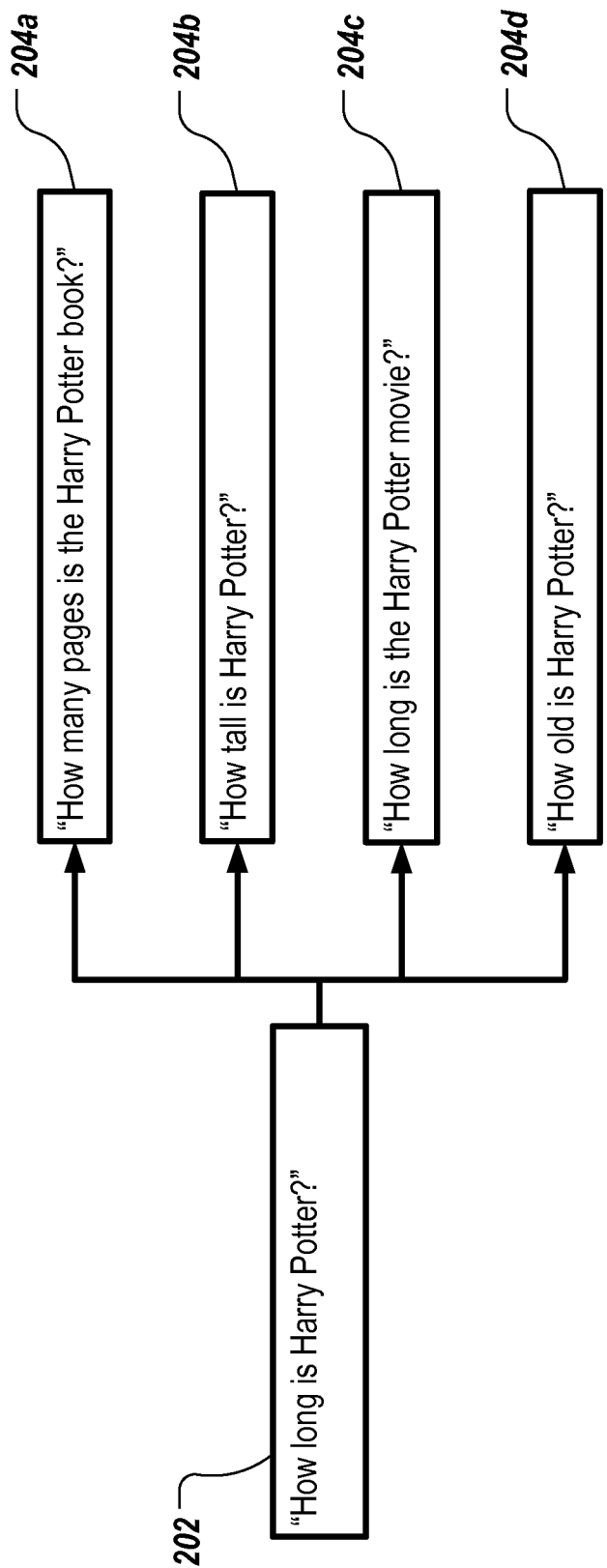
FIG. 2 depicts a schematic of example modified search queries.

FIG. 2 depicts a schematic of example modified search queries 204a-d. Each example modified search query 204a-d is generated from the particular search query 202 and a canonical search query for a semantic interpretation. In FIG. 2, the example particular query 202 is the string "how long is harry potter." First example modified search query 204a is "how many pages is the harry potter book," and can be associated with a semantic interpretation that the particular query 202 refers to the length of a book. Second example modified search query 204b is "how tall is harry potter," and can be associated with a semantic interpretation that the particular query 202 refers to the height of the character "Harry Potter." Third example modified search query 204c is "how long is the harry potter movie," and can be associated with a semantic interpretation that the particular query 202 refers to the length in time of a movie. Fourth example modified search query 204d is "how old is harry potter," and can be associated with a semantic interpretation that the particular query 202 refers to the age of the character "Harry Potter." These are example modified search queries for the example particular search query 202; other modified search queries are possible.

Figure 3:
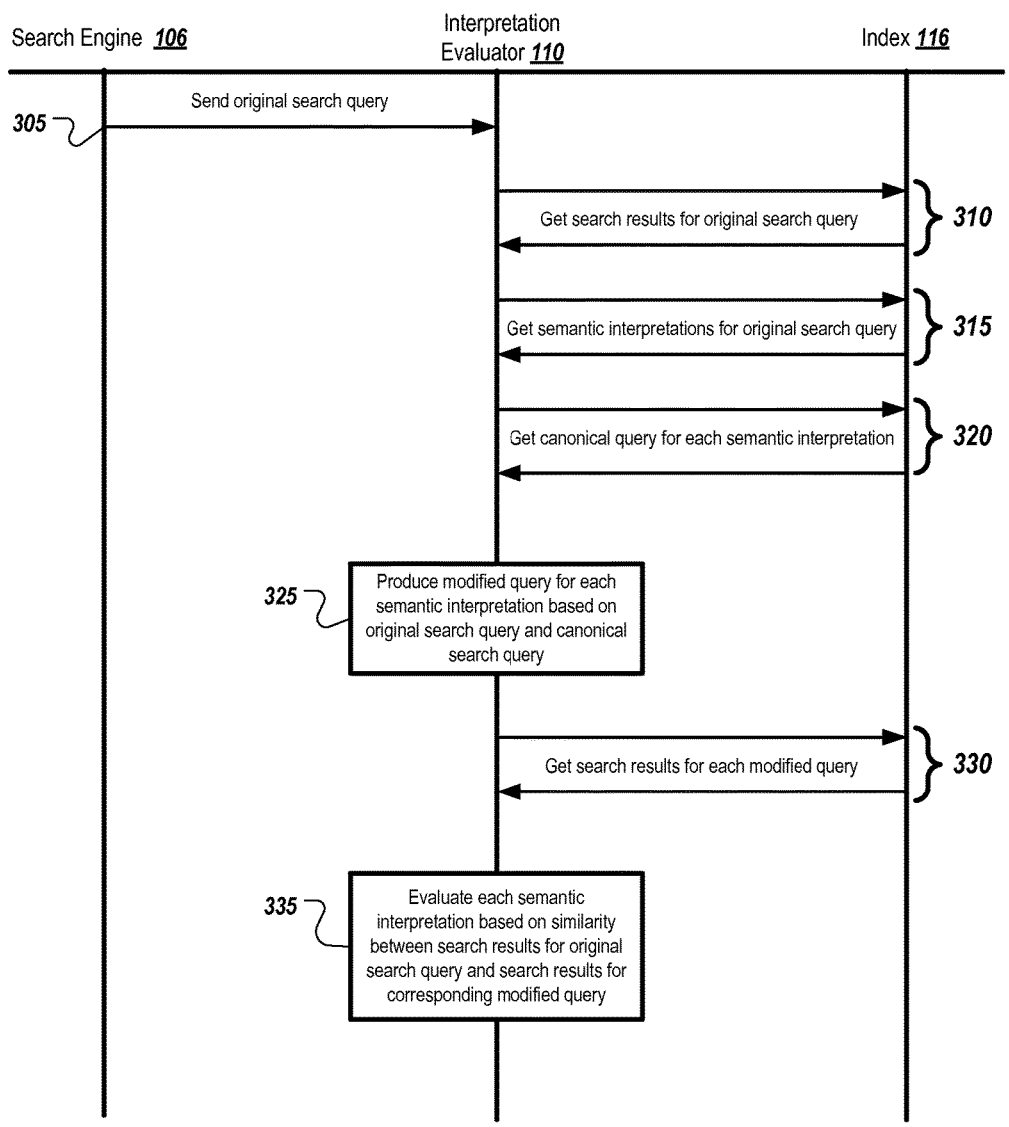
FIG. 3 depicts a flow diagram for an example process for evaluating semantic interpretations of a search query.

FIG. 3 depicts a flow diagram for an example process 300 for evaluating semantic interpretations of a search query. The process 300 includes interaction between a search engine 106, an interpretation evaluator 110, and an index 116 for evaluating semantic interpretations of a search query. At 305, an original search query is sent from the search engine 106 to the interpretation evaluator 110. At 310, the interpretation evaluator 110 sends the original search query retrieves search results for the original search query from the index 116.

At 315, the interpretation evaluator 110 gets semantic interpretations for the original search query from the index 116. In some cases, the semantic interpretations may be stored separately from the index 116, in which case the interpretation evaluator 110 would retrieve the semantic interpretations from a separate component or system. At 320, the interpretation evaluator 110 gets a canonical query for each semantic interpretation from the index 116.

At 325, the interpretation evaluator 110 produces a modified search query for each semantic interpretation based on the original search query and based on a canonical search query for that semantic interpretation. At 330, the interpretation evaluator 110 gets the search results for each modified search query from the index 116.

At 335, the interpretation evaluator 110 evaluates each semantic interpretation based on a similarity between search results for the original search query and search results for the corresponding modified search query. The interpretation evaluator 110 may evaluate a semantic interpretation using one or more of the techniques described previously relative to FIG. 1.

Figure 4:
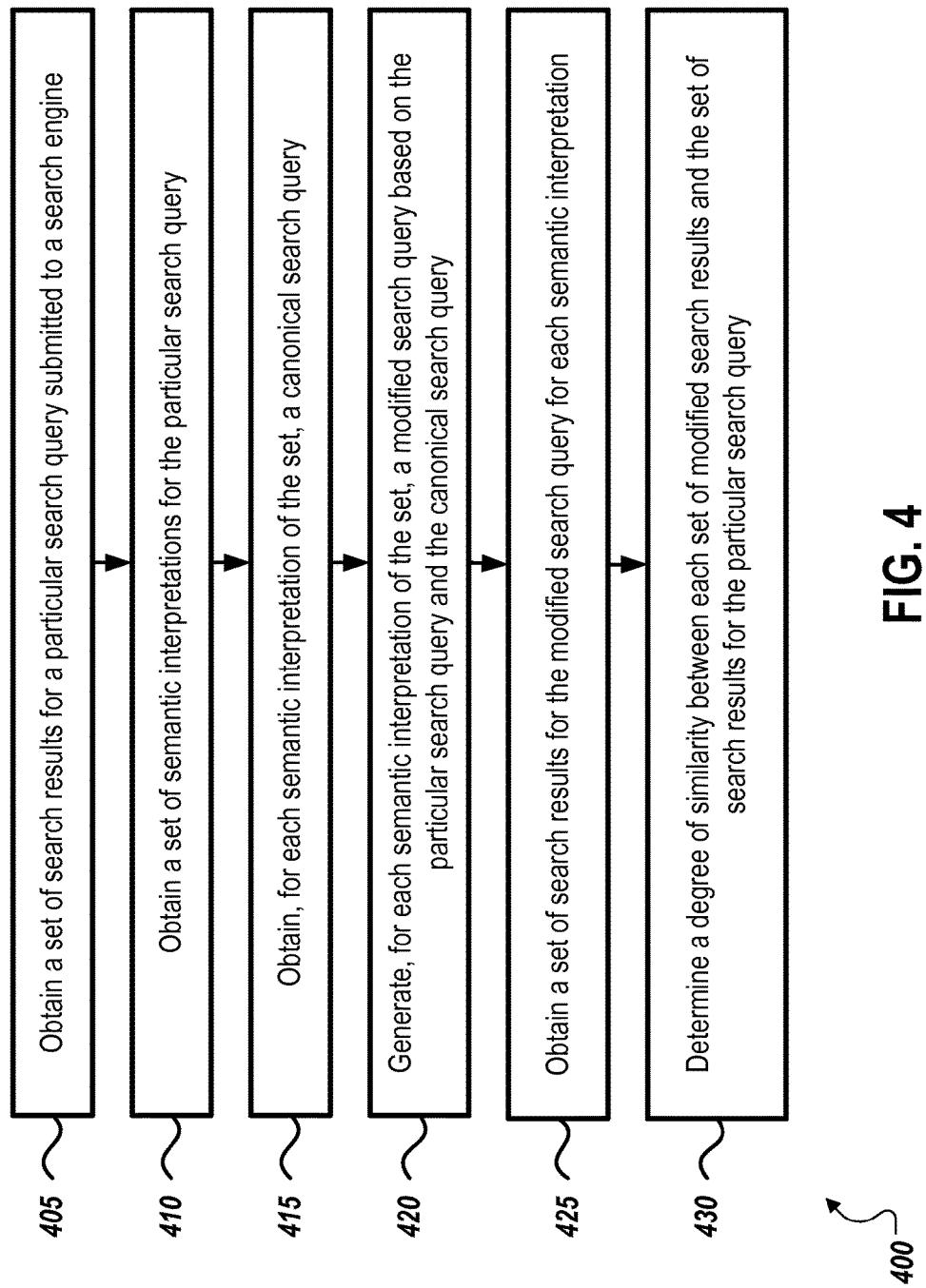
FIG. 4 depicts an example process for evaluating semantic interpretations of a search query.

FIG. 4 depicts an example process 400 for evaluating semantic interpretations of a search query. At 405, a set of search results is obtained for a particular search query submitted to a search engine. At 410, a set of semantic interpretations is obtained for the particular search query, and each semantic interpretation represents a candidate intent associated with the particular search query. At 415, a canonical search query is obtained for each semantic interpretation of the set of semantic interpretations.

At 420, a modified search query is generated for each semantic interpretation of the set of semantic interpretations. The modified search query can be based at least in part on the particular search query and the canonical search query for the semantic interpretation. In some cases, generating the modified search query for each semantic interpretation includes reformatting the particular search query to match the canonical search query for the semantic interpretation. In some implementations, generating the modified search query for each semantic interpretation includes replacing a substring included in the particular search query identifying a particular entity with an alternate substring identifying the particular entity included in the canonical search query for the semantic interpretation. At 425, a set of search results for the modified search query for the semantic interpretation is obtained for each semantic interpretation of the set of semantic interpretations.

At 430, for each semantic interpretation of the set, a degree of similarity is determined between the set of search results of the modified search query for the semantic interpretation and the set of search results for the particular search query. The degree of similarity can be determined using techniques previously described. In some cases, determining the degree of similarity is based at least in part on the size of an intersection of, or a difference between the set of search results for the modified search query and the set of search results for the particular search query. In some cases, determining the degree of similarity is based at least in part on the frequency of occurrence of particular keywords associated with the particular search query in the set of search results for the modified search query and the set of search results for the particular search query. Determining the degree of similarity may be based at least in part on comparing an order of the set of search results for the modified search query with an order of the set of search results for the particular search query. In some cases, a particular semantic interpretation may be selected based on the degrees of similarity.

Figure 5:
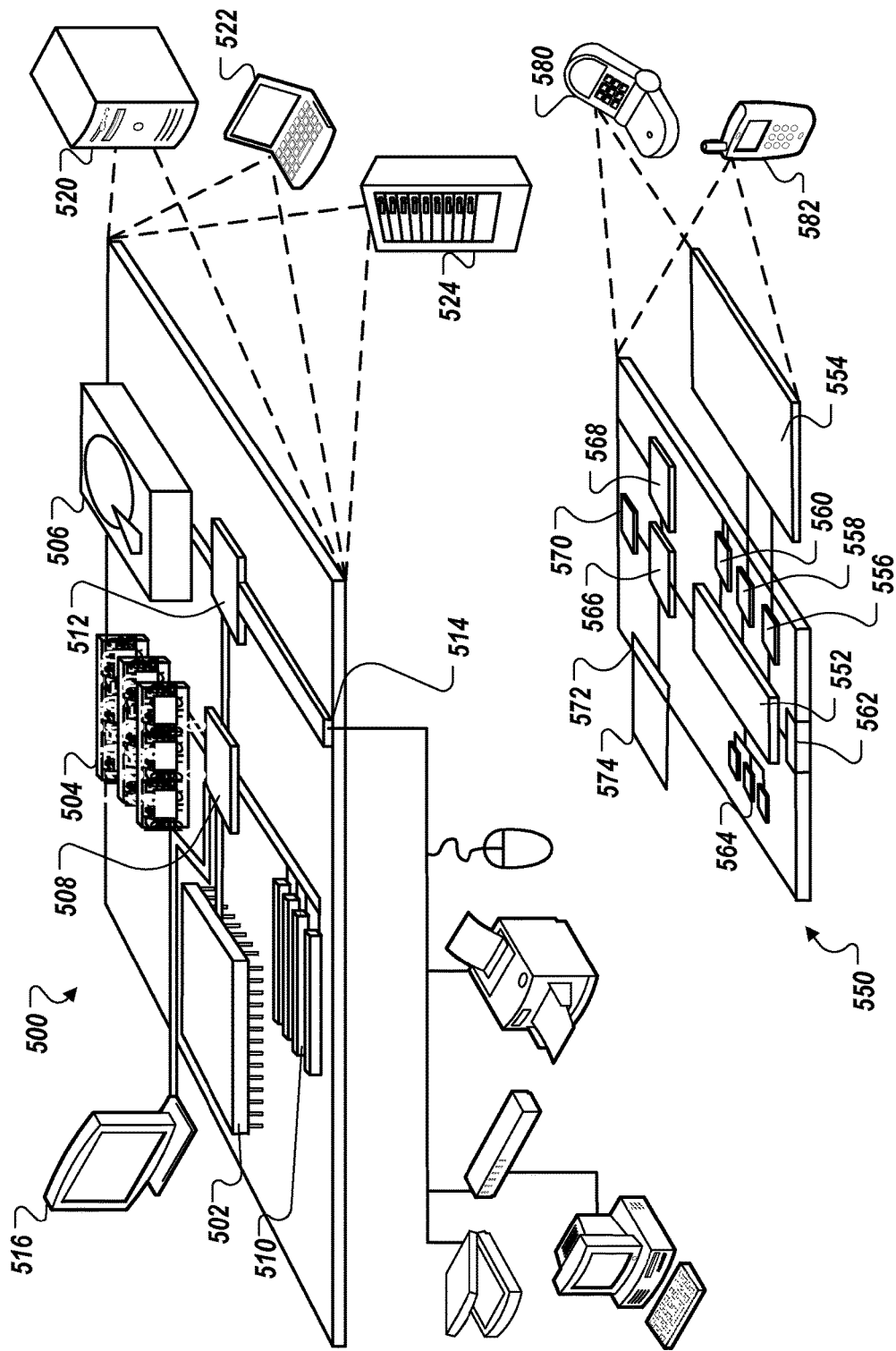
FIG. 5 is a block diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 510 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems, methods, apparatus, and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:

obtaining a set of search results for a particular search query submitted to a search engine, wherein the particular search query includes a substring that is a subset of terms of the query, and where the subset of terms identifies a particular entity;

obtaining a set of semantic interpretations for the particular search query, each semantic interpretation representing a candidate intent associated with the particular entity identified by the subset of terms included in the particular search query;

obtaining, for each semantic interpretation of the set, a canonical search query;

generating, for each semantic interpretation of the set, a modified search query based at least in part on the particular search query and the canonical search query for the semantic interpretation, wherein generating the modified search query for each semantic interpretation includes replacing, in the particular search query, the substring included in the particular search query identifying the particular entity with an alternate substring that includes (i) the subset of terms that identify the particular entity included in the particular search query and (ii) includes a second set of terms from the canonical search query for the semantic interpretation, wherein the second set of terms were not included in the particular search query;

obtaining, for each semantic interpretation of the set, a set of search results for the modified search query for the semantic interpretation;

determining, for each semantic interpretation of the set, a degree of similarity between (i) the set of search results of the modified search query for the semantic interpretation, and (ii) the set of search results for the particular search query, wherein determining the degree of similarity is based at least in part on comparing attributes of the set of search results for the modified search query with attributes of the set of search results for the particular search query; and selecting a particular semantic interpretation of the set of semantic interpretations based on the degrees of similarity between the set of search results of the modified search query for the particular semantic interpretation and the set of search results for the particular search query.

2. The method of claim 1, wherein generating the modified search query for each semantic interpretation includes reformatting the particular search query to match the canonical search query for the semantic interpretation.

3. The method of claim 1, wherein determining the degree of similarity is based at least in part on the size of an intersection between the set of search results for the modified search query and the set of search results for the particular search query.

4. The method of claim 1, wherein determining the degree of similarity is based at least in part on the size of a difference between the set of search results for the modified search query and the set of search results for the particular search query.

5. The method of claim 1, wherein determining the degree of similarity is based at least in part on the frequency of occurrence of particular keywords associated with the particular search query in the set of search results for the modified search query and the set of search results for the particular search query.

6. The method of claim 1, wherein determining the degree of similarity is based at least in part on comparing an order of the set of search results for the modified search query with an order of the set of search results for the particular search query.

7. A non-transitory, computer-readable medium storing instructions operable when executed to cause at least one processor to perform operations comprising:
  obtaining a set of search results for a particular search query submitted to a search engine, wherein the particular search query includes a substring that is a subset of terms of the query, and where the subset of terms identifies a particular entity;
  obtaining a set of semantic interpretations for the particular search query, each semantic interpretation representing a candidate intent associated with the particular entity identified by the subset of terms included in the particular search query;
  obtaining, for each semantic interpretation of the set, a canonical search query;
  generating, for each semantic interpretation of the set, a modified search query based at least in part on the particular search query and the canonical search query for the semantic interpretation, wherein generating the modified search query for each semantic interpretation includes replacing, in the particular search query, the substring included in the particular search query identifying the particular entity with an alternate substring that includes (i) the subset of terms that identify the particular entity included in the particular search query and (ii) includes a second set of terms from the canonical search query for the semantic interpretation, wherein the second set of terms were not included in the particular search query;
  obtaining, for each semantic interpretation of the set, a set of search results for the modified search query for the semantic interpretation;
  determining, for each semantic interpretation of the set, a degree of similarity between (i) the set of search results of the modified search query for the semantic interpretation, and (ii) the set of search results for the particular search query, wherein determining the degree of similarity is based at least in part on comparing attributes of the set of search results for the modified search query with attributes of the set of search results for the particular search query; and
  selecting a particular semantic interpretation of the set of semantic interpretations based on the degrees of similarity between the set of search results of the modified search query for the particular semantic interpretation and the set of search results for the particular search query.

8. The computer-readable medium of claim 7, wherein generating the modified search query for each semantic interpretation includes reformatting the particular search query to match the canonical search query for the semantic interpretation.

9. The computer-readable medium of claim 7, wherein determining the degree of similarity is based at least in part on the size of an intersection between the set of search results for the modified search query and the set of search results for the particular search query.

10. The computer-readable medium of claim 7, wherein determining the degree of similarity is based at least in part on the size of a difference between the set of search results for the modified search query and the set of search results for the particular search query.

11. The computer-readable medium of claim 7, wherein determining the degree of similarity is based at least in part on the frequency of occurrence of particular keywords associated with the particular search query in the set of search results for the modified search query and the set of search results for the particular search query.

12. The computer-readable medium of claim 7, wherein determining the degree of similarity is based at least in part on comparing an order of the set of search results for the modified search query with an order of the set of search results for the particular search query.

13. A system comprising:
  memory for storing data; and
  one or more processors configured to perform operations comprising:
    obtaining a set of search results for a particular search query submitted to a search engine, wherein the particular search query includes a substring that is a subset of terms of the query, and where the subset of terms identifies a particular entity;
    obtaining a set of semantic interpretations for the particular search query, each semantic interpretation representing a candidate intent associated with the particular entity identified by the subset of terms included in the particular search query;
    obtaining, for each semantic interpretation of the set, a canonical search query;
    generating, for each semantic interpretation of the set, a modified search query based at least in part on the particular search query and the canonical search query for the semantic interpretation, wherein generating the modified search query for each semantic interpretation includes replacing, in the particular search query, the substring included in the particular search query identifying the particular entity with an alternate substring that includes (i) the subset of terms that identify the particular entity included in the particular search query and (ii) includes a second set of terms from the canonical search query for the semantic interpretation, wherein the second set of terms were not included in the particular search query;

obtaining, for each semantic interpretation of the set, a set of search results for the modified search query for the semantic interpretation;

determining, for each semantic interpretation of the set, a degree of similarity between (i) the set of search results of the modified search query for the semantic interpretation, and (ii) the set of search results for the particular search query, wherein determining the degree of similarity is based at least in part on comparing attributes of the set of search results for the modified search query with attributes of the set of search results for the particular search query; and selecting a particular semantic interpretation of the set of semantic interpretations based on the degrees of similarity between the set of search results of the modified search query for the particular semantic interpretation and the set of search results for the particular search query.

14. The system of claim 13, wherein generating the modified search query for each semantic interpretation includes reformatting the particular search query to match the canonical search query for the semantic interpretation.

\* \* \* \* \*

UNITED STATES PATENT AND TRADEMARK OFFICE
CERTIFICATE OF CORRECTION

PATENT NO. : 10,353,964 B2
APPLICATION NO. : 14/644803
DATED : July 16, 2019
INVENTOR(S) : Venugopal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 763 days.

Signed and Sealed this
Nineteenth Day of May, 2020

Andrei Iancu
*Director of the United States Patent and Trademark Office*